June 4, 1968  T. H. JOHNSTONE ET AL  3,386,761
VEHICLE BODY DOOR LATCH AND LOCKING SYSTEM
Filed Nov. 22, 1965  3 Sheets-Sheet 1
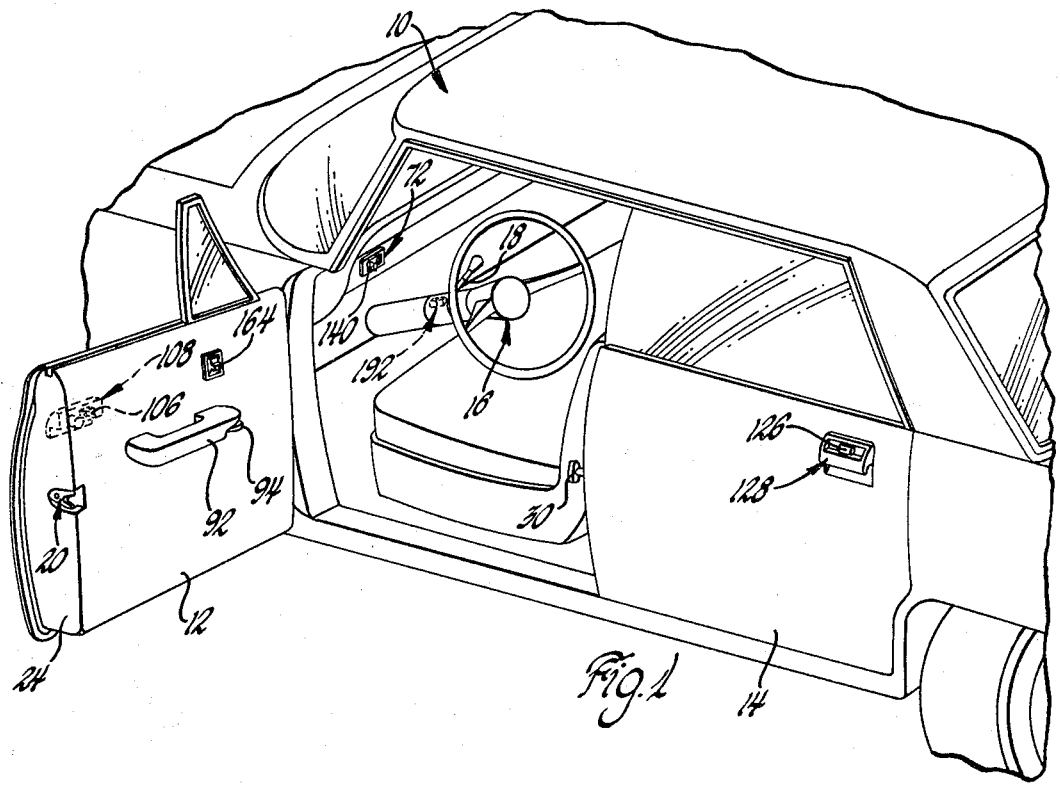
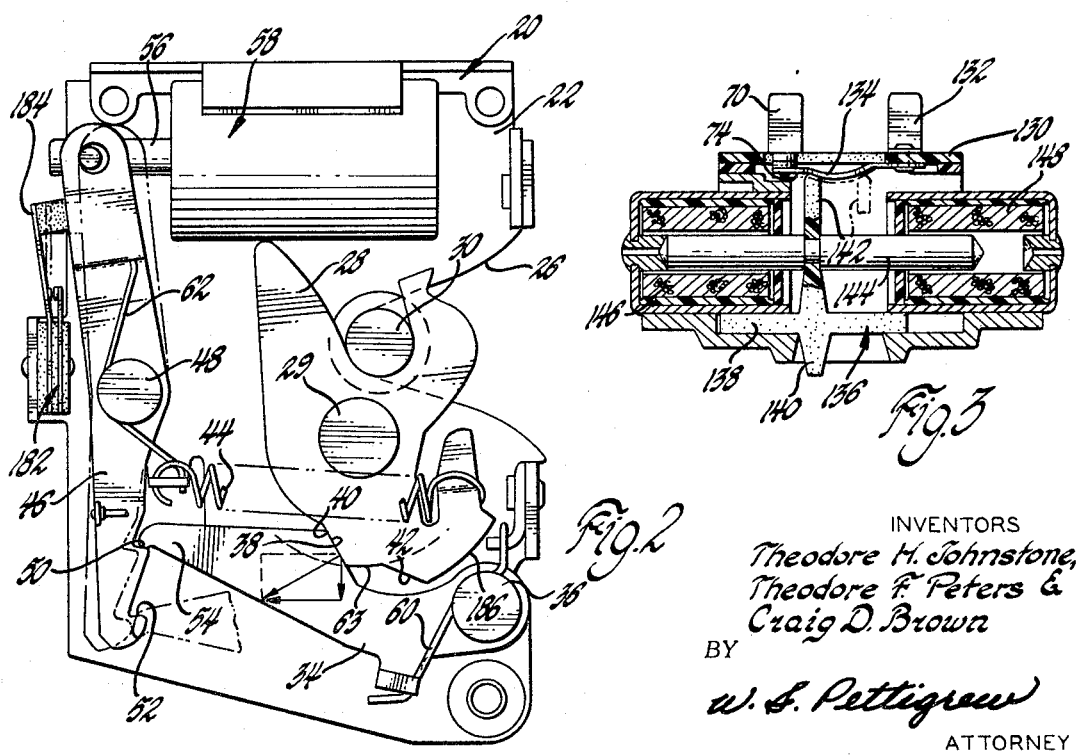
INVENTORS
*Theodore H. Johnstone,*
*Theodore F. Peters &*
*Craig D. Brown*
BY
*W. S. Pettigrew*
ATTORNEY

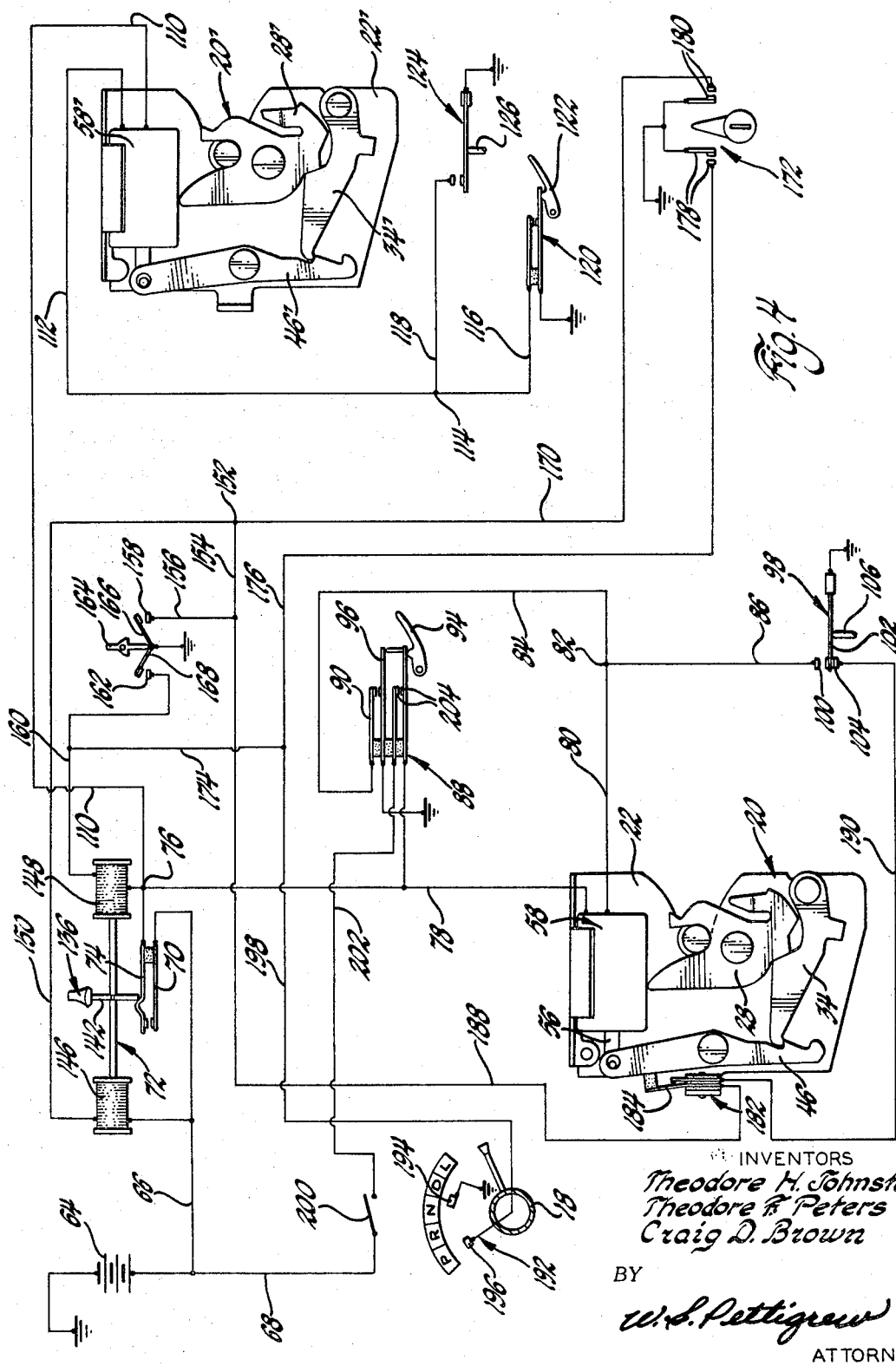

INVENTORS
Theodore H. Johnstone,
Theodore F. Peters &
Craig D. Brown
BY
W. S. Pettigrew
ATTORNEY 3,386,761
VEHICLE BODY DOOR LATCH AND
LOCKING SYSTEM
Theodore H. Johnstone, New Baltimore, Theodore F.
Peters, Utica, and Craig D. Brown, Birmingham,
Mich., assignors to General Motors Corporation, Detroit, Mich., a corporation of Delaware
Filed Nov. 22, 1965, Ser. No. 508,894
12 Claims. (Cl. 292—201)

ABSTRACT OF THE DISCLOSURE

A locking system which includes a bolt and a solenoid-released detent. The control circuit for the solenoid includes inside and outside selector switches and a manual locking control to selectively lock or unlock the system. Automatic undogging and keyless locking are provided.

---

This invention relates to vehicle bodies and more particularly to a new and improved vehicle body door latch and locking system.

Heretofore, the more comprehensive methods of latching and locking of vehicle body doors have been accomplished by providing for each of the doors a completely mechanically operative latch assembly having a complicated array of links, levers, etc., conventionally including some form of movable bolt engageable with a striker on the body in door closed position, one or more detent levers for holding the bolt in latched position in engagement with the striker, and a series of operating levers operable to selectively release the detent levers under manipulation of an outside push button mechanism or an inside remote handle assembly. For locking the door against unauthorized detent release from outside the vehicle, there is further provided one or more locking levers interposed in the operating lever train to render the outside push button ineffective thereon or on the detent levers, these locking levers being manipulable between locked and unlocked conditions from inside the vehicle as by a garnish molding button and associated linkage and from the outside as by an exteriorly mounted key cylinder lock.

In vehicles produced by the assignee of the instant invention, the latch assembly has traditionally further included some form of mechanical automatic undogging element or elements which, when the latch assembly has been placed in locked condition when the door is open, are operable when the door is slammed shut to automatically return the locking levers to unlocked condition so that the operator will not inadvertently lock himself out of the vehicle. Further traditionally provided by the assignee is some form of mechanical keyless locking element or elements which are selectively operable to negate the automatic undogging means such that the operator may consciously cause the locking levers to remain in locked condition when the door is slammed shut and thus not be required to manipulate the exterior key cylinder.

Further to the mechanical complexity attending these more or less standard functions of such prior latch assemblies, there has been a growing demand for so-called coincidental locking provisions wherein all or selected ones of the vehicle body doors are power-locked or unlocked by the mere throwing of a switch or the like located adjacent the driver's area. Such coincidental locking systems have been generally provided by placing on each of the various mechanical door latch assemblies some form of power-operator operable directly on the locking levers or on connecting linkage between such levers and the garnish molding button. These systems add considerable parts and cost to the already complicated and expensive mechanical latch assembly and to the bulk of the latch assembly within the door.

The vehicle body latch and locking system of this invention departs entirely from prior concepts and provides all of the aforenoted functions with a latch assembly having but basically two mechanical latch elements, i.e., a bolt, and a detent. In an illustrative embodiment, all other functions are accomplished entirely electrically. Rather than requiring the usual mechanical operating lever system with its associated outside push button mechanism and inside handle assembly, each door is released by a solenoid which is selectively energizable by the mere closing of either of two operating switches mounted to the inside and outside of the door. A control circuit for the solenoid includes means for selectively locking the door against release by either operating switch, and these locking means are arranged for coincidental or simultaneous locking of all vehicle doors as by a master control switch. The locking means are conveniently actuated by the driver or passenger either by an inside selector switch as on each front door or by key cylinder lock operated switches on the exterior of the front doors. Should the driver or passenger inadvertently place the system in locked condition before leaving the car, the locking means are automatically electrically undogged to unlocked condition when either front door is slammed shut. However, if the driver or passenger consciously desires that the system remain in locked condition, he may simply depress the outside operating switch as he closes the door to achieve electric keyless locking. The system lends itself to many other highly desirable features of operation, such as automatic locking of all vehicle body doors in response to some predetermined operating condition of the vehicle as, for example, the placing of the vehicle transmission selector in a forward range.

Further details of improvement in the system are the provision of a master locking control including a switch in the latch release solenoid operating circuit having a manual actuator member for selectively opening or closing the switch to selectively lock or unlock the system, a pair of miniature solenoids operable on the actuator member for remote control of the switch, and means on the actuator member and a contact of the switch for detenting the switch in a selected condition. Further, the basic mechanical latch assembly of the system is operable to hold the door closed in either a fully latched or an intermediate safety latched position, the detent of the latch being so arranged as to allow pushing of the door from safety latched to fully latched positions without necessitating energization of the latch release solenoid. Moreover, so that the latch release solenoid may be of minimum output rating and of resulting low cost, a minimum release detenting arrangement is provided wherein a detent lever of the latch is caused to experience a cam-out tendency away from latching engagement with the bolt, and a third or blocking lever releasably holds the detent against this tendency and requires but little force from the release solenoid to break detenting engagement.

The primary object of this invention is to provide a new and improved vehicle body door latch and locking system. Another object of this invention is to provide a new and improved door latch and locking system including mechanical latch bolt means for holding the door closed and mechanical detent means for holding the latch means in latched position, power-operated means for selectively releasing the detent means, and circuit means for controlling the power-operated means including inside and outside operating means for energizing the power-operated means and locking means for selective prevention of functioning of the operating means. A further object of this invention is to provide in the power circuit means provisions for automatic undogging and keyless locking. Still another object of this invention is to arrange the locking means of the circuit means for coincidental locking of all vehicle doors. Yet a further object of this invention is to provide an electrical latch and locking system wherein the inside and outside operating means, the locking means, and the automatic undogging and keyless locking means are all provided by simple electrical switches. Still another object of this invention is to provide a coincidental latch and locking system including a master electrical switch for selectively simultaneously locking and unlocking all vehicle body doors, the switch being either manually actuable between its two conditions or being remotely controllable from a number of stations within and outside of the vehicle body. Still a further object of this invention is to provide means for automatically locking the system in response to the existence of some predetermined operating condition of the vehicle body.

A more specific object of this invention is to provide in a combined manually actuable and remotely controllable master control switch, a movable contact member for alternately opening and closing a pair of circuit controlling terminals, a manual actuating member for moving the contact member between its positions, and a pair of power operators operatively connected to the actuating member to remotely control the contact member through manipulation of exterior key-controlled or other locking and unlocking switches, automatic operation of door responsive undogging switches, or manipulation of exterior keyless locking switches. A further specific object of this invention is to provide a mechanical vehicle body latch assembly including latch means rotatable about an axis between unlatched, intermediate safety, and fully latched positions, and minimum release effort detent means including a detent lever and a blocking lever so arranged that movement of the latch means from safety latched to fully latched positions may proceed without interference from, or movement of the detent means or require energization of a detent release solenoid.

These and other objects, features and advantages of the invention will be readily apparent from the following specification and the drawings wherein:

FIGURE 1 is a fragmentary perspective view of a vehicle body including a door latch and locking system according to this invention;

FIGURE 2 is a view of a mechanical latch assembly for the system;

FIGURE 3 is a sectional view of a master control switch for the system;

FIGURE 4 is a schematic of the system; and

Figure 5:
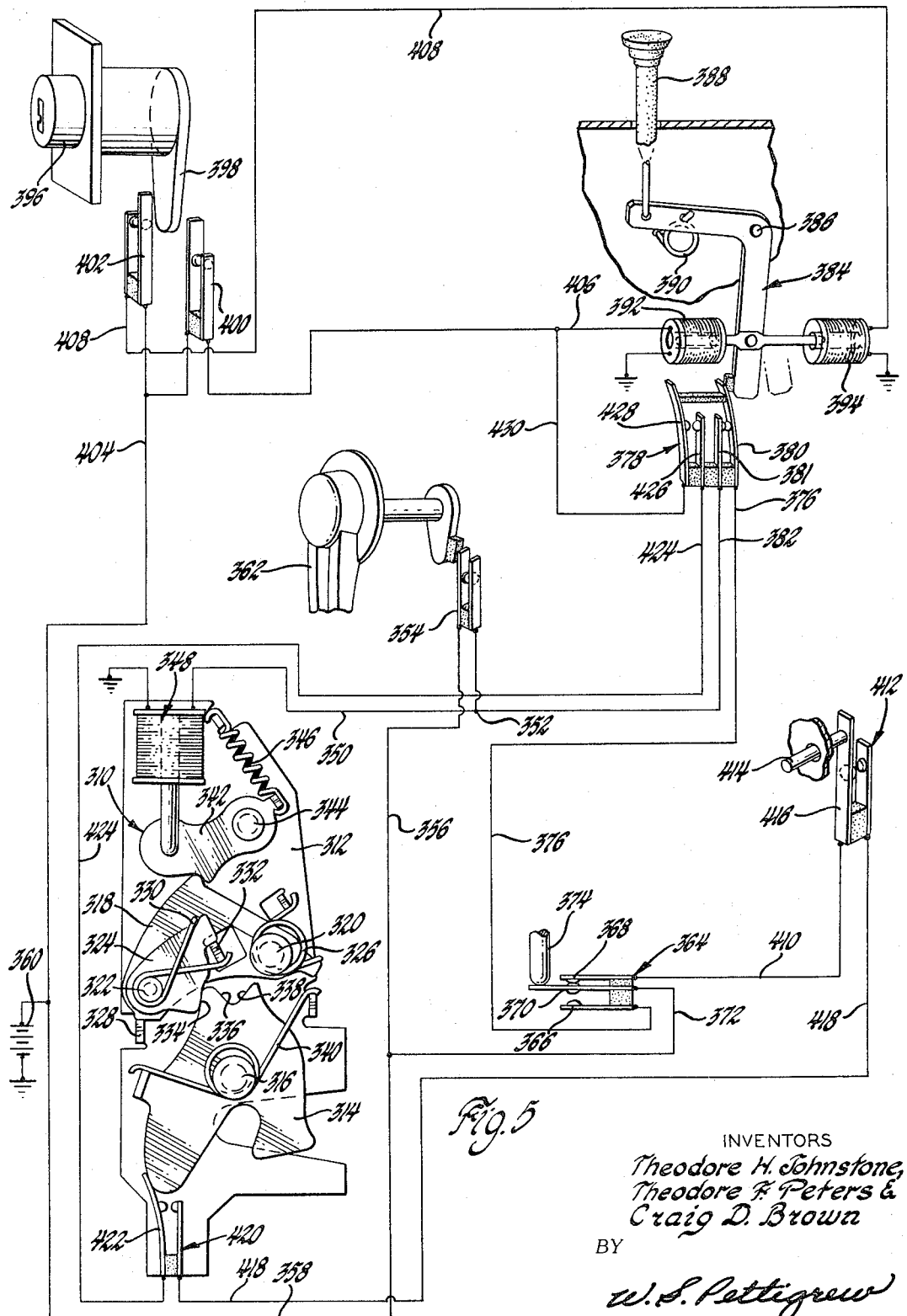
FIGURE 5 is a schematic of a second embodiment of the system.

Referring now particularly to FIGURES 1 through 4 of the drawings, the latch and locking system of this invention is shown and described as installed in a sedan style vehicle body designated generally as 10 and including at each side thereof a front door 12 hingedly mounted adjacent its forward edge for swinging movement between an open position as shown and a closed position, not shown, and a rear door 14 similarly mounted for swinging movement between open and closed positions. Within the forward passenger area of the body is mounted the usual steering column and wheel assembly 16 which in turn mounts thereon a conventional transmission selector 18.

Proceeding first with particular reference to the front door 12 shown, there is provided therewithin a mechanical latch assembly 20 which, as seen best in FIGURE 2 illustrating a righthand door version, includes a latch frame or base plate 22 adapted to be bolted to the rearward jamb panel 24 of the door and having at one edge a striker receiving opening or cutout 26 contiguous with a similar opening in the jamb panel, FIGURE 1. A forked bolt member 28 is rotatably mounted on the latch plate at 29 for movement between a latched position, as shown in FIGURE 2, and an unlatched position, indicated in FIGURE 1, wherein the fork of the bolt is disposed to receive a conventional headed pin striker element 30 extending forwardly from the body center pillar. As the door moves to closed position, bolt 28 is caused to rotate counterclockwise over and embrace the shank of striker 30, which is further embraced by the cutout edges of the plate 22 for firm vertical alignment of the door. The head of the striker overlies the bolt in the latched position thereof to provide an interlock against longitudinal separation of the door and body. For releasably holding the bolt 28 in latched position, a detent lever 34 is pivoted on plate 22 at 36 and includes a detent shoulder 38 engageable in the fully latched position of the bolt with a shoulder 40 thereon. Should the door 12 be incompletely moved toward fully closed position, the detent shoulder 38 on the detent lever is initially engageable with a safety shoulder 42 in an intermediate or partially rotated safety position of the bolt. A coil tension spring 44 is hooked between a leg of the bolt and a lanced out tab on plate 22 to bias the bolt to unlatched position. Shoulders 40 and 42 on the bolt, and detent shoulder 38 on the detent lever are formed for engagement along a line so angularly oriented with respect to an intersecting radius from the bolt pivot 29 and/or a perpendicular to an intersecting radius from detent lever pivot 36 that a significant cam-out force is exerted on the detent lever by the forced clockwise tendency on the bolt from unlatched position that arises from spring 44. In conventional practice, this tendency of course also may arise from the compression of the usual seal strip around door 12. The cam-out force is that illustrated resolved component of the unlatching force seeking to rotate detent lever counterclockwise from detenting position, the other component being reacted at the pivot 36 of the detent lever. For holding the detent lever in engagement with the bolt shoulders in opposition to the cam-out component, a holding or blocking lever 46 is pivoted on the latch plate at 48 and includes a pair of blocking shoulders 50 and 52 adapted to underlie a foot 54 at the remote end of the detent lever in either detenting position thereof.

A coil torsion spring 60 biases the detent lever clockwise for engagement with bolt 28, while a further torsion spring 62 biases the blocking lever counterclockwise for operative engagement with the detent foot 54. It is seen that to release the bolt 28, there is required only that minimum force and travel sufficient to rotate the blocking lever 46 slightly clockwise against the action of spring 62 and the friction between either blocking shoulder 50 or 52 and foot 54 arising from the cam-out component thereon. Accordingly, mounted to the upper end of the blocking lever 46 a significant lever arm away from the pivot thereof, is a shiftable armature 56 of a solenoid 58 mounted to the latch plate, the solenoid being only of that minimum output rating sufficient to provide the aforenoted minimum release force. While it is of course possible to eliminate blocking lever 46 and use but a single pivoted detent lever in conventional manner, it is apparent that the mechanical latch assembly portion of the system of this invention includes but generally three moving parts providing for latching of door 12 in either a fully closed or intermediate safety position thereof, and positive detenting on the bolt adapted for minimum release as by the output of a miniature solenoid.

With regard to this combination of full and safety latching provisions on the bolt and a minimum release detenting arrangement therefor, it is to be noted that bolt 28 is formed with a bearing surface 63 extending between the shoulders 40 and 42 generally concentrically of pivot 29 of the bolt. Thus, assuming the bolt 28 to be initially detented in safety latched position with detent foot 54 engaged on the lower blocking shoulder 52, further counterclockwise rotation of the bolt may proceed with the detent lever remaining stationary and detent shoulder 38 merely riding over the surface 63 until permitted to be biased into shoulder 40 when the bolt reaches fully latched position. Detent foot 54 accordingly cams upwardly and over the upper blocking shoulder 50 to detent the bolt in fully latched position. In this way, with door 12 having been incompletely slammed shut to safety latched position, the door may be merely pushed further inward to full latched position, and it is not required that solenoid 58 be energized for reopening and slamming shut of the door.

Having thus accomplished the latching and detenting function for each door, the remaining functions of the system reside completely in the power-operating arrangement now to be described. While this description and the drawings specifically refer to an electric power-operating system, it will be understood that other forms of power-operation are equally feasible and may employ in place of the solenoid 58 some other form of detent release operator such as a vacuum motor. In this embodiment, the power source for the system is provided by the vehicle battery 64 which is suitably grounded and delivers current through either of two primary leads 66 and 68. Lead 66 extends to one terminal means 70 of a locking control or master locking switch assembly 72 which is physically located, as seen in FIGURE 1, immediately ahead of the vehicle operator on the vehicle dashboard. A particular description of the master control switch, will appear later. Assuming that the movable contact member 74 of master switch 72 is closed to terminal 70, battery current thus flows to a junction 76 from which extends a solenoid lead 78 connected, for purposes of present description, to one side of solenoid 58 of the latch assembly 20 for front door 12. Extending from the other side of the solenoid is a lead 80 to a junction 82 from which extends an inside operating lead 84 and an outside operating lead 86. Lead 84 extends to one contact 90 of a normally open double pole switch 88 suitably mounted to a conventional arm rest 92 on the inside of front door 12, FIGURE 1, and operable by a pivoted inside switch operating member 94. When it is desired to energize solenoid 58 for release of latch 20 of the front door, the operator merely pivots member 94 to thereby close a movable grounded contact 96 of switch 88 to contact 90 and thus ground the solenoid. Armature 56 is thus withdrawn to rotate blocking lever 46 clockwise and release the detent lever for rotatioin of bolt 28 from the latched position.

Lead 86 on the other hand extends to one contact 100 of an outside operating means or switch 98 which includes a movable grounded contact 102 which is normally open from contact 100 but closed to a further contact 104 for purposes later to appear. Movable contact 102 is suitably adapted for deflection by a push rod 106 or similar element of an outside operating handle assembly 108 mounted to the exterior of door 12, FIGURE 1. Solenoid 58 is thus energizable by the mere depression of the push rod 106 to connect contact 100 to the grounded movable contact 102.

Considering now the operation of the left side rear door 14, it is seen in FIGURE 4 that an identical latch assembly 20' therefor likewise includes a miniature solenoid 58'. For energization of this solenoid, there extends thereto from junction 76 a rear door solenoid lead 110, and another solenoid lead 112 extends to a junction 114 to which is connected an inside operating lead 116 and an outside operating lead 118. Lead 116 extends to a rear door inside operating means or normally open and grounded single throw switch 120 operable by a rear door inside operating member 122 which is similar to that for front door switch 88. Lead 118 extends to a rear door outside operating means or normally open and grounded switch 124 which is again operable by a push rod 126 of an outside handle assembly 128, FIGURE 1. As with the front door, manipulation of either switch 120 or 124 energizes the rear door solenoid for release of the door from either the inside or the outside of the vehicle.

It is apparent from the preceding description that operation of the latches 20 and 20' for the left side front and rear doors 12 and 14 is dependent upon current flow through the closed contacts of master control switch 72 to the junction 76. It should now also be understood that this switch and junction 76 similarly control the right side front and rear doors of the body which employ latch assemblies and detent release solenoids identical to that described above. The right side front and rear doors are accordingly further provided with inside and outside operating switches identical to those just described.

*Locking*

For locking of all four vehicle doors, it is apparent that the contact member 74 of master switch 72 need merely be opened from terminal 70 so as to prevent current supply to all detent release solenoids. This may be simply accomplished by a manual switch actuator, but as it is desired that locking control of the various doors be accomplished from a number of stations within the vehicle, the master control switch 72 incorporates provisions for remote operation thereof.

Referring to FIGURE 3, the master control switch, previously mentioned as being physically located on the dashboard, includes an insulative mounting body 130 having secured thereto the one terminal 70 and a complementary further contact terminal 132. The movable contact member 74 is fabricated of suitable spring steel or other resilient material and includes intermediate its ends an undulated portion 134. The contact member is so formed and secured to the terminal 132 as to be disposed when relaxed in a position indicated in broken lines, wherein its contact is open from the terminal 70. An actuating member 136 includes a portion 138 slidably received within the body 130 of the switch, a finger portion 140 manipulable by the vehicle operator or passenger, and a leg 142 extending into engagement with the contact member 74. Actuating member 136 is reciprocable between a locking position, indicated in broken lines, wherein the end of leg 142 lies to one side of the undulated portion 134, and an unlocking position wherein the leg 142 has resiliently deformed the contact member into closure with terminal 70 and lies to the other side of the undulated portion 134. This undulated portion and the leg 142 provide resilient detenting means for releasably holding the actuating member in either position in which it is placed.

Leg 142 mounts an armature 144 extending to either side of the leg for reception in an opposed pair of solenoid actuators 146 and 148. Solenoid 146 is adapted upon energization to overcome the resilient detenting and draw armature 144 and the actuating member 136 leftwardly to unlocking position closing the contact member 74 to terminal 70, while solenoid 148 is operable to overcome the detenting and draw the armature and actuating member rightwardly to locking position.

Reverting to FIGURE 4, master control switch 72 is remotely operable from a number of stations within or outside the vehicle. The unlocking solenoid 146 has connection at one side thereof to primary lead 66 and battery 64, while a lead 150 extends from the other side thereof to a junction 152, a lead 154 and a further lead 156 carrying a contact 158. Locking solenoid 148 is connected at one side thereof directly to junction 76 and has connection at its other side through a lead 160 to a contact 162. Contacts 158 and 162 reside in an individual door locking switch or inside selector means mounted, for example, to the inside of the front door 12 for convenient manipulation by the vehicle operator and including a manual selector 164 alternately pivotable to either close a grounded contact 166 to contact 158 whereby to ground and energize unlocking solenoid 146, or to close a grounded contact 168 to contact 162 to ground and energize the locking solenoid 148. It is to be understood that leads 150 and 160 may connect with a similar individual selector means mounted to the inside of the right side front door for convenient control of master control switch 72 by the front seat passenger.

Extending from junction 152 is a lead 170 to an outside selector means or key cylinder lock and switch 172, while a lead 174 connecting with lead 160 joins with a lead 176 also extending to the switch 172. Switch 172 is suitably mounted to the outside door handle assembly 108 on front door 12, FIGURE 1, and includes a first set of contacts 178 responsive to rotation of the lock cylinder in one direction to ground leads 176 and 174 to the locking solenoid 148, while opposite cylinder rotation actuates a second set of contacts 180 to ground leads 170 and 150 to unlocking solenoid 146. It is thus seen that master control switch 72 is operable from outside the vehicle by an authorized person possessing a suitably coded key to either lock or unlock the system. A similar outside key cylinder lock and switch may be provided on the right side front door and similarly wired to the master control switch for control of the system.

Automatic Undogging

Referring to FIGURE 2, the latch assembly 20 for each front door 12 has provided thereon an undogging switch 182 including a resilient contact 184 having an insulative nose bearing on the upper portion of blocking lever 46 which holds the switch open when located in the position shown in solid lines. Assuming now that the front door 12 has been unlatched and opened to allow rotation of bolt 28 clockwise to unlatched position, a surface 186 of the bolt displaces the detent lever 34 to a released position, not shown, wherein detent foot 54 lies below the lower end of the blocking lever to permit the blocking lever to assume its full line position under the action of torsion spring 62. Subsequent movement of door 12 to closed position rotates the bolt 28 counterclockwise to allow torsion spring 60 to return the detent lever clockwise initially to move detent foot 54 over the lower blocking shoulder 52 corresponding to the safety position of the bolt, and then further clockwise and over the upper blocking shoulder 50 in full latched position. It is seen that this movement of detent foot 54 causes oscillation of the blocking lever between the solid and broken line positions shown to alternately open and momentarily close the contact 184 of the undogging switch 182. As is apparent, this closure occurs even as the latch assembly moves only to safety latched condition, as well as with complete movement to full latched condition.

Reverting again to FIGURE 4, the contact 184 is connected by a lead 188 to the junction 152 and thence from lead 150 to the unlocking solenoid 146, while the other contact of the undogging switch is connected via a lead 190 to the normally grounded contact 104 of the outside operating switch 98. Thus, assuming that the vehicle operator or passenger has initially placed the master control switch 72 in locked condition and then moves the open front door 12 toward closed position, it is seen that the resulting movement in latch assembly 20 momentarily closes automatic undogging switch 182, at least once, to establish a circuit from battery 64 through unlocking solenoid 146 and to the grounded contact 104 of the outside operating switch 98. This energizes the unlocking solenoid to automatically return the master control switch 72 to unlocked condition so that the vehicle operator may not inadvertently lock himself out of the vehicle. Again, it is to be understood that the latch assembly for the right side front door includes identical provisions for automatic undogging.

Keyless locking

Assuming the conditions just described in connection with automatic undogging, means are provided for allowing the vehicle operator or passenger to initially place the master switch 72 in locked condition and subsequently slam the door shut as described, yet have the locking system remain in locked condition. As seen in FIGURE 4, the automatic undogging sequence depends on pre-existent closure between contacts 104 and 102 of the outside operating switch 98 whereby to ground one leg of the undogging switch 182. If the operator or passenger consciously desires that the system remain in unlocked condition as he moves the door closed, he need merely depress the push rod 106 to break contact between contacts 104 and 102, and the undogging switch 182 is thus not operative to ground unlocking solenoid 146. In this connection, it is to be noted that the breaking of contact by depression of the push rod need be effected only as the door immediately approaches fully closed condition. Again, keyless locking is also contemplated for the right side front door.

Automatic locking

The latch and locking system of this invention also includes provisions for automatic locking of master control switch 72 during some predetermined operating condition of the vehicle ordinarily necessitating such locking out of safety considerations. This, for example, may obtain from the placing of the transmission selector 18 in forward range. As seen in FIGURE 4, the transmission selector has suitably associated therewith an automatic locking switch 192 having one grounded contact 194 disposed intermediate the "neutral" and "drive" positions so as to be engaged or wiped by a movable contact 196 responsive to rotation of the transmission selector between these positions. Contact 196 is connected by a lead 198 to lead 174 which connects through lead 160 to the locking solenoid 148. Thus, assuming the master control switch 72 to be initially in unlocked condition wherein the contact member 74 is closed to battery 64 such that all vehicle doors may be unlatched, it is seen that movement of the transmission selector from "neutral" to "drive" momentarily completes the circuit through the locking solenoid and between ground and battery 64. This momentary circuit completion energizes the locking solenoid to automatically place the master control switch in locked condition wherein the contact member 74 is opened from terminal 70.

Selective inside unlatching when locked

Assuming now that the master control switch 72 is in locked condition, the operator or front passenger may cause energization of the detent release solenoid of the respective front door latch assembly without having first to unlock the master control switch 72 by means of either the selector 164, the manual actuator member 136 or otherwise. A switch 200 connected to the primary lead 68 connects to a lead 202 extending to the second pole of the double-pole switch 88 on front door 12, as well as to the counterpart inside operating switch on the right front door. The second set of normally open contacts 204 of switch 88 are again closable by the inside operating member 94 to transmit current from battery 64 through the closed switch 200 and into the solenoid lead 78 to solenoid 58. Concurrently, contacts 90 and 96 are closed so that lead 84 is closed to ground. Switch 200 is preferably arranged so as not to be closed unless the vehicle is in such a condition as to safely allow door opening movement. Switch 200 may thus be responsive to the transmission selector 18 so that it is open when the selector is in forward or reverse ranges and closed when the selector is in "park" or "neutral."

It is apparent that when using an inside operating member 94 to unlatch and open either front door under the above selective inside unlatching conditions, the undogging switch 182 will be momentarily closed as the parts of latch assembly 20 displace from fully latched position, and accordingly, master control switch 72 will be returned to unlocked condition as by the automatic undogging sequence described above.

FIGURE 5 system

In this second embodiment of the door latch and locking system, there is provided for each of the various vehicle body doors a door latch assembly 310 including a frame 312 mounted to the door, and a forked bolt 314 pivoted to the frame at 316 and engageable during door closing movement with suitable pin striker means on the vehicle body. Such engagement rotates the bolt from a fully unlatched through a safety latched position, not shown, to the fully latched position shown. For holding the bolt in either fully latched or safety latched position to hold the door closed, there is provided a detent lever assembly including a detent lever 318 pivoted to frame 312 at 320 and in turn pivotally mounting at 322 a detent dog 324. A torsion spring 326 biases the detent lever counter-clockwise relative to the frame and toward a stop 328, while a further torsion spring 330 biases the detent dog clockwise of the detent lever and toward a stop 332 locating a detent shoulder 334 of the detent dog to be engageable with either a fully latched detent shoulder 336 or a safety latched detent shoulder 338 of the bolt 314.

A coil torsion spring 340, together with whatever seal pressure is exerted on the door in closed position, seeks to rotate the bolt 314 toward fully unlatched position, which tendency normally forces the detent lever assembly clockwise about the pivot 320 of the detent lever by virtue of a minimum release force arrangement similar to that of the previously described door latch assembly 20. For holding the detent assembly in a detenting position as shown, a blocking lever 342 is pivoted to frame 310 at 344 and biased by a tension spring 346 normally into engagement with the detent lever 318 in a manner to directly react the clockwise tendency thereon. Clockwise rotation of the blocking lever from the blocking position shown releases the detent assembly to permit counter-clockwise rotation of bolt 314 from fully latched or safety latched position. It will be apparent that only momentary release of the blocking lever is required, and that after rotation of the bolt has stopped, the detent assembly will return against the stop 328 and the blocking lever 342 will reengage with the detent lever 318. Subsequent clockwise rotation of bolt 314 during door closing movement proceeds without requirement for release of the blocking lever since the dog 324 will be merely cammed clockwise out of the way by shoulders 336 and 338 of the bolt.

To selectively release the blocking lever 342, there is connected thereto an armature of a miniature detent release solenoid 348 or similar power operator mounted to the latch frame 312. One side of the solenoid is grounded while the other has a lead 350 extending to a junction 352. To this junction is connected one side of an inside operating switch 354 connected at its other side by a lead 356 and a further lead 358 to a power source or battery 360. Switch 354 is normally open and adapted to be selectively closed by an inside remote operating handle assembly 362 suitably rotatably mounted to the interior of the respective vehicle door or elsewhere. Rotation of the handle assembly closes the switch and delivers power from battery 360 to the grounded solenoid 348 for unlatching of the door latch assembly 310.

For unlatching the latch assembly 310 from outside the vehicle body, there is provided an outside operating switch 364 having stationary contacts 366 and 368, and a movable contact 370 connected via a lead 372 to the lead 358 and battery 360. This movable contact is normally located in the position shown and is responsive to inward depression of an outside push button assembly 374 or the like to be closed to stationary contact 366. This latter contact is connected by a lead 376 to one resilient normally open movable contact 380 of a double-pole locking switch 378. With this movable contact 380 of the locking switch being closed to its complementary stationary contact 381 as shown, power may flow through a lead 382 and the lead 350 to the grounded solenoid 348. Accordingly, inward depression of the push button 374 effects a circuit through the solenoid for unlatching of the door latch assembly 310 from the outside of the vehicle.

For preventing such unlatching from the outside of the vehicle, movable contact 380 of the locking switch 378 need merely be permitted to open from contact 381. A manual and remote locking arrangement for operating the locking switch 378 includes a bellcrank 384 suitably pivoted at 386 to the body structure and having an insulative nose engaging the movable contact 380. The other leg of the bellcrank has connected thereto a garnish button assembly 388 permitting manual rotation of the bellcrank to either an unlocking position shown in full lines, or a locking position shown in broken lines. An overcenter spring 390 holds the bellcrank in either selected position. It is apparent that by depression of the garnish button assembly 388, the movable contact 380 will return to its normally open position and the system will be locked against unlatching from the outside of the vehicle, while raising the garnish button assembly will close contact 380 to permit such outside unlatching.

Bellcrank 384 may be remotely actuated, as from outside of the vehicle or elsewhere, by an opposed pair of solenoids 392 and 394 having a common armature mounted to a leg of the bellcrank. Remote energization of the solenoids may be accomplished by such means as an outside key cylinder lock assembly 396 mounted to the outside of the vehicle body door and carrying a switch cam 398 selectively engageable with either of two normally open switches 400 and 402. Each of these switches has one leg thereof connected to battery 360 by a lead 404, and the other leg of switch 400 is connected via a lead 406 to one side of solenoid 392 while the other leg of the switch 402 is connected via a lead 408 to one side of the solenoid 394. Both solenoids have their other sides grounded so that either may be energized merely by closure of a corresponding switch 400 or 402; that is, solenoid 392 may be energized to unlock the system by closure of switch 400, or solenoid 394 may be energized to lock the system by closure of switch 402.

Assuming now that either the locking solenoid 394 has been energized or that garnish button assembly 388 has been depressed to open contact 380 and place the system in locked condition, automatic undogging of the system is effected as follows. With movable contact 370 of outside operating switch 364 being normally closed to contact 368, power may flow from lead 372 to a lead 410 extending to one side of a normally open door jamb switch 412. When the door is moved from open position to some position closely approaching fully closed position, a plunger 414 is engaged and depressed to close a movable contact 416 of switch 412 so that power is thus directed through a lead 418 extending to a normally closed automatic undogging switch 420 mounted to the latch frame 312. The movable contact 422 of this latter switch is adapted to be moved open by bolt 314 when reaching its fully latched position. However, as the bolt will not have reached its fully latched position when the door jamb switch 412 is initially actuated, power may flow momentarily through switch 420 and via a lead 424 to a stationary contact 426 of the second pole of switch 378. With the bellcrank 384 being located in its locked broken-line position, the movable contact 428 of the second pole has been permitted normal closure with contact 426 so that power thus flows through a lead 430 to the lead 406. A circuit is thus momentarily completed to the grounded unlocking solenoid 392 such that it is energized to automatically return bellcrank 384 to its unlocking position to thereby unlock the system. Immediately upon energization of unlocking solenoid 392, contact 428 is opened and the automatic undogging circuit is broken so that power is not thereafter unnecessarily expended in unlocking solenoid 392.

Switch 420 may of course be suitably arranged in latch assembly 310 to effect completion of an automatic undogging circuit when bolt 314 reaches safety latched position.

To achieve keyless locking or prevention of automatic undogging push button 374 need be merely depressed to open contact 370 of switch 364 from the stationary contact 368, thus breaking the circuit that would otherwise be completed for automatic undogging as described above. Push button depression is required only during the short period between initial actuation of door jamb switch 412 and full rotation of bolt 314 to reach its fully latched position.

Having thus described our invention, what is claimed is:

1. In a vehicle body including a door movable between open and closed positions, a power-operated door latch and locking system comprising: latch means movable between latched and unlatched positions; movable detent means engageable with said latch means to hold said latch means in the latched position thereof; power-operated means operatively connected to said detent means and operable upon energization to actuate said detent means out of engagement with said latch means; a source of power; and circuit means for controlling energization of said power-operated means, said circuit means including operating means for selectively connecting said power-operated means with said source, and locking means selectively operable to prevent connection of said power-operated means with said source upon selected operation of said operating means.

2. The system recited in claim 1 wherein said operating means includes first means manually operable from inside the vehicle body for selectively connecting said power-operated means with said source and second means manually operable from outside the vehicle body for selectively connecting said power-operated means with said source.

3. The system recited in claim 1 wherein said locking means includes control means in series with said operating means and adapted to selectively connect and disconnect said power-operated means to and from said source, second power-operated means operable to actuate said control means into either said connect or disconnect mode thereof, and selector means for controlling said second power-operated means.

4. A system according to claim 3 wherein said selector means includes first means manually operable from inside the vehicle body and second means manually operable from outside the vehicle body.

5. A system according to claim 1 wherein said locking means are selectable between a locked condition preventing connection of said power-operated means with said source by said operating means and an unlocked condition, and further including in said circuit means automatic undogging means operable in response to movement of said door from the open to the closed position thereof to restore said locking means from the locked to the unlocked condition thereof.

6. The system recited in claim 5 wherein said circuit means further includes keyless locking means selectively manually operable from outside the vehicle body to prevent operation of said automatic undogging means.

7. In a vehicle body including a door movable between open and closed positions, a power-operated door latch and locking system comprising: latch means including a bolt rotatable between latched and unlatched position; movable detent means engageable with said bolt to hold said bolt in the latched position thereof; power-operated means operatively connected to said detent means and adapted upon energization to move said detent means out of engagement with said bolt; a source of power; and circuit means for controlling energization of said power-operated means, said circuit means including operating means for selectively connecting said power-operated means with said source, locking means in series with said operating means and being selectable between a locked condition preventing connection of said power-operated means with said source by said operating means and an unlocked condition, and automatic undogging means operable in response to rotation of said bolt from the unlatched toward the latched position thereof to restore said locking means from the locked to the unlocked condition thereof.

8. A system according to claim 7 wherein said locking means includes control means in series with said operating means and adapted to selectively connect and disconnect said power-operated means and said source, second power-operated means operable to actuate said control means into either said connect or disconnect mode thereof, and manual selector means for controlling energization of said second power-operated means by said source, said automatic undogging means being responsive to rotation of said bolt to cause energization of said second power-operated means by said source to actuate said control means into the disconnect mode thereof.

9. A system according to claim 8 wherein said circuit means further includes keyless locking means selectively manually operable from outside the vehicle body to prevent operation of said automatic undogging means.

10. In a vehicle body including a door movable between open and closed positions, a power-operated door latch and locking system comprising: latch means rotatable about an axis between unlatched, intermediate safety latched, and fully latched positions, said latch means including first and second detent shoulders and a bearing surface extending between said shoulders and formed concentrically of said axis; movable detent means including a third detent shoulder engageable in a detenting position thereof with said first and second detent shoulders in the safety latched and fully latched positions respectively of said latch means to hold said latch means therein; blocking means normally engaging said detent means to hold the latter in the detenting position thereof; power-operated means operatively connected to said blocking means and adapted upon energization to move said blocking means to permit movement of said detent means from the detenting position thereof; a source of power; and circuit means for controlling energization of said power-operated means and including operating means for selectively connecting said power-operated means with said source, locking means for allowing or preventing connection of said power-operated means with said source by said operating means, and automatic undogging means operable upon said locking means in response to rotation of said latch means from the unlatched to the safety latched or from the safety latched to the fully latched position thereof.

11. A vehicle body closure latch comprising, latch means rotatable about an axis between unlatched, intermediate safety latched and fully latched positions and including first and second detent shoulders and a bearing surface extending between said shoulders and formed concentrically of said axis, detent means movable between detenting and nondetenting positions and including a third detent shoulder engageable in a detenting position with either said first or said second detent shoulders in the safety latched and fully latched positions respectively of said bolt, said first and second detent shoulders and said third detent shoulder being formed for engagement along the line so oriented with respect to the direction of rotation of said bolt as to provide for a substantial force component effective to cam said shoulders out of engagement upon forced rotation of said bolt in a direction toward the unlatched position thereof, a movable blocking lever selectively engageable with said detent lever to hold the latter in engagement with said bolt in opposition to said force component and prevent movement of said bolt toward the unlatched position thereof, said detent lever being movable over said bearing surface free of disturbance toward the nondetenting position thereof during movement of said bolt from the safety latched to the fully latched position thereof.

12. In a vehicle body including a door movable between open and closed positions, a door latching and locking system comprising: latch means operative in the closed position of said door to prevent movement of said door therefrom; electrical power-operated means operative to release said latch means for movement of said door to the open position thereof; a source of electrical power; and electrical circuit means for controlling said power-operated means, said circuit means including operating switch means adapted for selective connection of said power-operated means with said source, terminal means in series with said operating switch means and said source, contact means movable between a contact position connecting said terminal means and a noncontact position, actuating means operable upon said contact means and movable between a first position locating said contact means in the noncontact position thereof and a second position locating said contact means in the contact position thereof, second power-operated means operatively connected to said actuating means for moving said actuating means selectively and alternately between said positions thereof, automatic undogging switch means operable in response to movement of said door from the open to the closed position thereof for causing energization of said second power-operated means by said source to move said contact means from the contact to the noncontact position thereof, and keyless locking switch means selectively manually operable from outside the vehicle body for preventing said operation of said automatic undogging switch means.

References Cited

UNITED STATES PATENTS

| | | | |
|---|---|---|---|
| 1,153,514 | 9/1915 | North et al. | 292—210 |
| 1,312,895 | 8/1919 | Derby | 292—201 |
| 2,219,132 | 10/1940 | Hohmann et al. | 292—201 X |
| 2,716,568 | 8/1955 | Davies. | |
| 3,036,453 | 5/1962 | Dubonnet | 70—277 X |
| 3,113,447 | 12/1963 | Oishei | 292—201 X |
| 3,122,388 | 2/1964 | Powers | 292—201 X |
| 3,287,049 | 11/1966 | Shay | 292—216 X |

FOREIGN PATENTS 875,345   8/1961   Great Britain.

RICHARD E. MOORE, *Primary Examiner.*